(12) United States Patent
Watanabe (10) Patent No.: US 7,692,583 B2
(45) Date of Patent: Apr. 6, 2010

(54) GPS POSITION MEASURING DEVICE

(75) Inventor: Takayuki Watanabe, Fukushima (JP)

(73) Assignee: Alpine Electronics, Inc., Fukushima (JP)

( * ) Notice: Subject to any disclaimer, the term of this patent is extended or adjusted under 35 U.S.C. 154(b) by 245 days.

(21) Appl. No.: 11/938,026

(22) Filed: Nov. 9, 2007

(65) Prior Publication Data

US 2008/0158053 A1 Jul. 3, 2008

(30) Foreign Application Priority Data

Dec. 5, 2006 (JP) .............................. 2006-328148

(51) Int. Cl.
*G01S 1/00* (2006.01)

(52) U.S. Cl. ................................. 342/357.15

(58) Field of Classification Search ................................
342/357.13–357.15, 357.02
See application file for complete search history.

(56) References Cited

U.S. PATENT DOCUMENTS

| 5,359,521 | A * | 10/1994 | Kyrtsos et al. | ......... | 342/357.06 |
| 5,808,581 | A * | 9/1998 | Braisted et al. | ........ | 342/357.02 |
| 6,040,798 | A * | 3/2000 | Kinal et al. | ............ | 342/357.01 |
| 6,493,650 | B1* | 12/2002 | Rodgers et al. | ............. | 702/150 |
| 2002/0089446 | A1* | 7/2002 | Diggelen et al. | ....... | 342/357.13 |
| 2005/0033515 | A1 | 2/2005 | Bozzone | | |
| 2005/0062602 | A1* | 3/2005 | Fujiwara et al. | .......... | 340/539.1 |
| 2005/0234638 | A1* | 10/2005 | Ogaki et al. | ................. | 701/209 |
| 2006/0049927 | A1* | 3/2006 | Arai | ........................... | 340/438 |
| 2006/0136173 | A1* | 6/2006 | Case et al. | ................... | 702/182 |
| 2006/0155461 | A1* | 7/2006 | Cho | ........................... | 701/207 |
| 2007/0279794 | A1* | 12/2007 | Chang | ......................... | 360/75 |

FOREIGN PATENT DOCUMENTS

| JP | 05/045436 | 2/1993 |
| JP | 09/061269 | 3/1997 |
| JP | 2000/275051 | 10/2000 |
| JP | 2006/214993 | 8/2006 |

* cited by examiner

*Primary Examiner*—Thomas H Tarcza
*Assistant Examiner*—Fred H Mull
(74) *Attorney, Agent, or Firm*—Brinks Hofer Gilson & Lione (57) ABSTRACT

A GPS position-measuring device includes a altitude-information memory for storing altitude information of a moving object, a combination determining unit for determining GPS-satellite combinations from GPS satellites that can be tracked, a position measuring unit for measuring a GPS based or GPS derived three-dimensional position of the moving object for each GPS-satellite combination, and a difference extracting unit for determining a difference in altitude between GPS derived altitude information contained in the measured GPS related three-dimensional position and the altitude information supplied from the altitude-information memory. The GPS position-measuring device further includes a position determining unit for comparing the extracted difference in altitude with a threshold value, selecting a GPS-satellite combination with which the difference in altitude is less than or equal to the threshold value, and determining a measurement position of the moving object based on the GPS derived three-dimensional position of the selected GPS-satellite combination.

16 Claims, 7 Drawing Sheets

| NUMBERS OF (FIVE) GPS SATELLITES | | 3 | 7 | 15 | 24 | 29 | MEASUREMENT POSITION | | | ABSOLUTE ALTITUDE OBTAINED FROM BAROMETER Z0 [m] | DIFFERENCE [m] BETWEEN Z AND Z0 |
|---|---|---|---|---|---|---|---|---|---|---|---|
| | | | | | | | X [DEGREE(x100) + MINUTE] | Y [DEGREE(x100) + MINUTE] | Z [m] | | |
| GPS COMBINATIONS (EACH INCLUDING FOUR SELECTED SATELLITES) | 1 | O | O | O | O | | 3541.354297 | 13941.78353 | 578 | | 516 |
| | 2 | O | O | O | | O | 3541.315951 | 13941.70944 | 61 | | 1 |
| | 3 | O | O | | O | O | 3541.347396 | 13941.74889 | 386 | 62 | 324 |
| | 4 | O | | O | O | O | 3541.347656 | 13941.77096 | 490 | | 428 |
| | 5 | | O | O | O | O | 3541.344336 | 13941.74479 | 356 | | 294 |

| NUMBERS OF (FIVE) GPS SATELLITES | 3 | 7 | 15 | 24 | 29 | MEASUREMENT POSITION | | | ABSOLUTE ALTITUDE OBTAINED FROM BAROMETER $Z_0$ [m] | DIFFERENCE [m] BETWEEN Z AND $Z_0$ |
|---|---|---|---|---|---|---|---|---|---|---|
| | | | | | | X [DEGREE(x100) + MINUTE] | Y [DEGREE(x100) + MINUTE] | Z [m] | | |
| GPS COMBINATIONS (EACH INCLUDING FOUR SELECTED SATELLITES) 1 | O | O | O | O | | 3541.354297 | 13941.78353 | 578 | 62 | 516 |
| 2 | O | O | O | | O | 3541.315951 | 13941.70944 | 61 | | 1 |
| 3 | O | O | | O | O | 3541.347396 | 13941.74889 | 386 | | 324 |
| 4 | O | | O | O | O | 3541.347656 | 13941.77096 | 490 | | 428 |
| 5 | | O | O | O | O | 3541.344336 | 13941.74479 | 356 | | 294 |

| M1,Z1 | M2,Z2 | . . . | Mp,Zp |
|---|---|---|---|
| . . . | . . . | . . . | . . . |
| . . . | . . . | . . . | Mn,Zn |

GPS POSITION MEASURING DEVICE

RELATED APPLICATIONS

The present application claims priority to Japanese Patent Application Serial Number 2006-328148, filed on Dec. 5, 2006, the entirety of which is hereby incorporated by reference.

BACKGROUND OF THE INVENTION

1. Field of the Invention

The present invention relates to a GPS (global positioning system) position-measuring device, a GPS position-measuring method, and a GPS position-measuring program which measure the position of a moving object by utilizing a GPS and also to a navigation system using the device, method, and the program.

2. Description of the Related Art

Position measurement utilizing GPS satellites (the measurement will hereinafter be referred to as "GPS position measurement") is widely used as a method for determining the positions of moving objects, such as motor vehicles. In the GPS position measurement, when three GPS satellites can be tracked, the two-dimensional position (the latitude and longitude) of the moving object can be measured, and when four or more GPS satellites can be tracked, the three-dimensional position (the latitude, longitude, and altitude) of the moving object can be measured. In the GPS position measurement, the number of GPS satellites that can be tracked varies depending on the position-measuring environment. Thus, a method that uses the altitude obtained by the most-recent three-dimensional position measurement is also available when only the two-dimensional position can be measured.

Japanese Unexamined Patent Application Publication No. 5-45436 discloses a GPS receiver having an atmospheric-pressure sensor. When only two-dimensional position measurement can be performed, the GPS receiver uses altitude information determined from an atmospheric pressure to perform three-dimensional position measurement.

Japanese Unexamined Patent Application Publication No. 2000-275051 discloses a navigation apparatus. This navigation apparatus determines altitude information from barometric-pressure data. When multiple roads having different altitudes from each other exist on a road map, the navigation apparatus selects a road that is close to the determined altitude information to perform matching of the vehicle on the map.

Japanese Unexamined Patent Application Publication No. 2006-214993 discloses a moving-object navigation apparatus. This moving-object navigation apparatus determines the position/speed of a moving object by measuring a barometric pressure, detecting the altitude of the moving object from the measured barometric pressure, and correcting the detected latitude based on the moving-object altitude obtained through GPS position measurement. When the GPS position measurement cannot be performed, the moving object navigation apparatus uses the altitude detected from the barometric pressure.

Japanese Unexamined Patent Application Publication No. 9-61269 discloses a barometer for measuring a barometric pressure including only changes originating from a weather condition by removing a barometric-pressure change originating from an altitude change.

As described above, GPS position measurement is used to determine the position of a moving object. However, a GPS receiver generally uses all signals of GPS satellites that can be tracked to perform position-measurement computation. For example, when the GPS receiver can track five or more GPS satellites, it determines GPS-satellite combinations therefrom and uses the average value of the three-dimensional positions of the determined combinations as the measurement position or selects a specific GPS-satellite combination based on the reception strengths and/or the elevation angles of GPS satellites and uses the three-dimensional position of the selected combination as the measurement position.

The GPS position measurement, however, has a drawback in that it is easily affected by the position-measurement environment. For example, when the moving object travels in an urban area where there are high-rise buildings and so on, the GPS receiver may receive multipath signals arriving from GPS satellites. The GPS receivers of the related art cannot determine signals from which GPS satellite are affected by multipath, and thus performs position measurement by using signals from a GPS satellite affected by the multipath. Consequently, there are problems in that the position measurement of the moving object has a large error and the accuracy of the GPS position measurement deteriorates.

SUMMARY OF THE INVENTION

Accordingly, the present invention has been conceived to overcome the foregoing problems of the related art, and one object of the present invention is to provide a GPS position-measuring device, a GPS position-measuring method, and a GPS position-measuring program which reduce the influence of multipath and have high position-measurement accuracy.

Another object of the present invention is to provide a GPS position-measuring device, a GPS position-measuring method, and a GPS position-measuring program which identify a GPS satellite affected by multipath and which do not use the identified GPS satellite to measure the position of a moving object.

Still another object of the present invention is to provide a navigation apparatus that can accurately display the position of a moving object, such as a vehicle, and that can perform route guidance of the moving object by using the GPS position-measuring device, the GPS position-measuring method, or the GPS position-measuring program.

The present invention provides a GPS position-measuring device for determining a position of a moving object by using GPS position measurement. The GPS position-measuring device includes: an altitude obtaining unit for obtaining non-GPS derived or based altitude information $Z_0$ of the moving object; a measuring unit for (1) determining GPS-satellite combinations from among multiple GPS satellites that can be tracked and (2) measuring a GPS derived or based three-dimensional position of the moving object for each GPS-satellite combination that is based upon GPS information; and a difference extracting unit for determining a difference in altitude between GPS derived or based altitude information Z contained in the measured GPS derived or based three-dimensional position and the non-GPS derived or based altitude information $Z_0$ obtained by the obtaining unit; and a position determining unit for (a) comparing the extracted difference in altitude with a threshold value, (b) selecting a GPS-satellite combination for which the difference in altitude is less than or equal to the threshold value, and (c) determining a measurement position of the moving object based on the GPS derived or based three-dimensional position of the selected GPS-satellite combination.

Preferably, the measuring unit determines n "see four" GPS-satellite combinations, where n indicates the number of GPS satellites that can be tracked and is a natural number that is equal to 5 or more, and each GPS-satellite combination including at least four GPS satellites. This arrangement can measure the three-dimensional position of the moving object by using a combination of four GPS satellites. The measuring unit may exclude a combination with which a PDOP value for the GPS satellites is larger than or equal to a predetermined value. This is because a larger PDOP value due to GPS-satellite geometry reduces the measurement accuracy.

When multiple GPS-satellite combinations with which the difference is less than or equal to the threshold exist, the position determining unit may select a combination with which the difference is a minimum from the multiple combinations and determine the three-dimensional position of the combination as the measurement position. Alternatively the position determining can use an average of the three-dimensional positions of the multiple combinations as the measurement position.

When a combination with which the difference is less than or equal to the threshold does not exist, the position determining unit may exclude the three-dimensional position obtained by the measuring unit from being used as the measurement position. The altitude information $Z_0$ obtained by the obtaining unit may be an absolute altitude determined from a barometric pressure measured by a barometer. Alternatively, the altitude information $Z_0$ obtained by the obtaining unit may be an absolute altitude determined from a road map database.

Preferably, the position determining unit changes the threshold in accordance with reliability of the altitude information $Z_0$ obtained by the obtaining unit. The reliability of the altitude information $Z_0$ is, for example, the reliability of the barometer. The threshold can be increased for higher reliability and, conversely, the threshold can be reduced for lower reliability.

A GPS position-measuring method or program according to the present invention includes a step of obtaining altitude information $Z_0$ of a moving object; and a step of determining n "see four" GPS-satellites combinations from multiple GPS satellites that can be tracked and measuring a three-dimensional position of the moving object for each GPS-satellite combination, where n is a natural number. The method or the program further includes a step of determining a difference between altitude information Z contained in the measured three-dimensional position and the altitude information $Z_0$ obtained in the obtaining step; and a step of comparing the difference with a threshold; a step of selecting a GPS-satellite combination with which the threshold is less than or equal to the threshold; and a step of determining a measurement position of the moving object based on the three-dimensional position of the selected combination.

According to the present invention, when the difference between the moving-object altitude information $Z_0$ obtained by a method other than GPS position measurement and the altitude information Z measured by GPS position measurement exceeds the threshold, it is determined that the GPS-satellite combination includes a GPS satellite affected by multipath, and the combination is excluded from the GPS position measurement. This arrangement can prevent the GPS position measurement from being affected by multipath and can prevent the position-measurement accuracy from decreasing. As a result, the position accuracy of the moving object is increased compared to the related art, and further, the moving object can be accurately displayed on a road map of a display of a navigation apparatus using GPS position measurement.

DESCRIPTION OF THE PREFERRED EMBODIMENT

An embodiment of the present invention will be described in detail with reference to the accompanying drawings.

Figure 1:
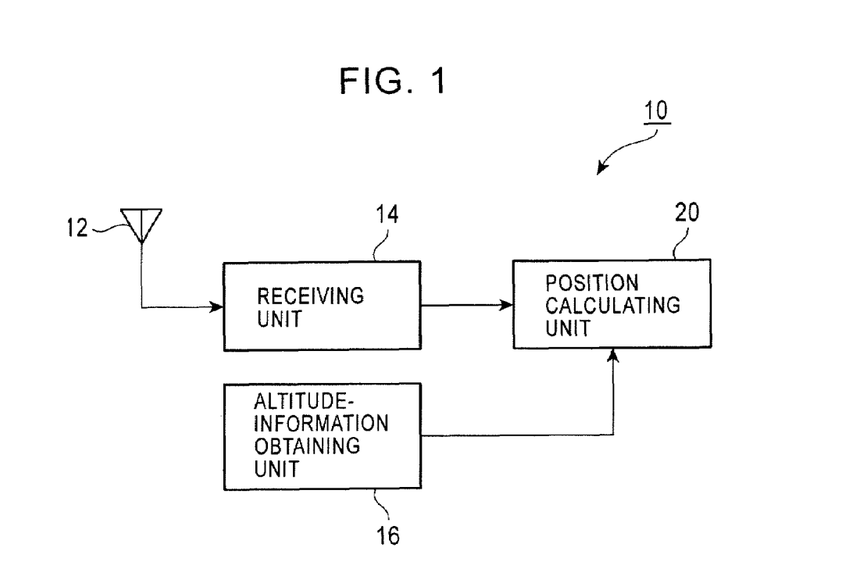
FIG. 1 is a block diagram showing the configuration of a GPS position-measuring device according to an embodiment of the present invention.

FIG. 1 is a block diagram of the configuration of a GPS position-measuring device according to an embodiment of the present invention. A GPS position-measuring device 10 includes a GPS receiving antenna 12, a receiving unit 14, an altitude-information obtaining unit 16, and a position calculating unit 20. The GPS receiving antenna 12 receives signals transmitted from GPS satellites. The receiving unit 14 performs processing, such as decoding, on the received signals and sends the resulting signals to the position calculating unit 20. The altitude-information obtaining unit 16 obtains the altitude information of a moving object in real-time by using a method other than the GPS position measurement (in other words, non-GPS based or derived altitude information). Based on the signals received by the receiving unit 14 and the altitude information obtained by the altitude-information obtaining unit 16, the position calculating unit 20 calculates the position of the moving object. The position calculating unit 20 includes, for example, a microcomputer, and can calculate the position of the moving object in accordance with a program stored in a ROM (read only memory) or RAM (random access memory).

Figure 2:
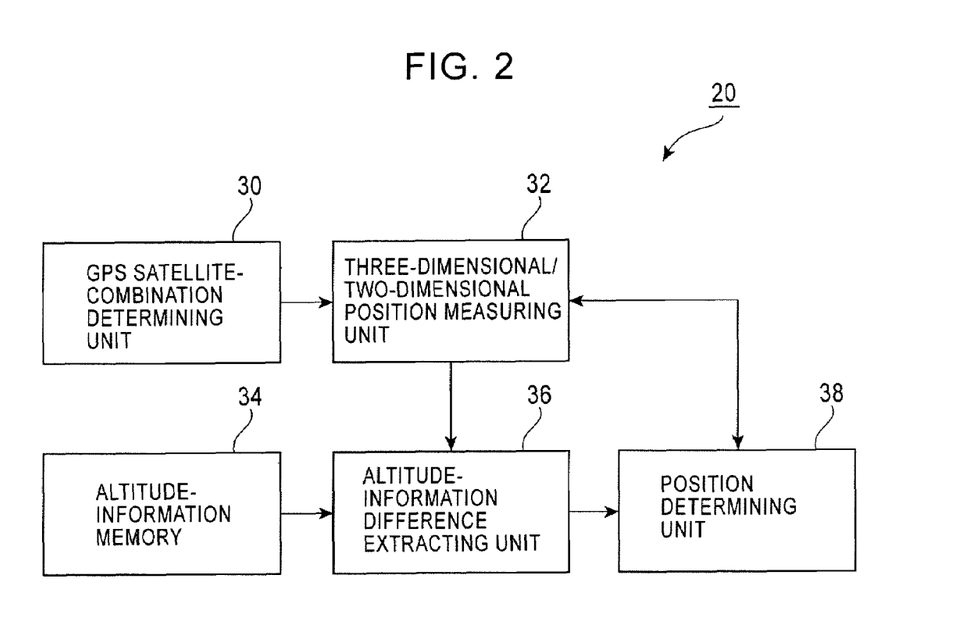
FIG. 2 is a block diagram showing the functional configuration of the position calculating unit shown in FIG. 1.

FIG. 2 is a block diagram of the functional configuration of the position calculating unit 20 shown in FIG. 1. The position calculating unit 20 includes a GPS-satellite-combination determining unit 30, a three-dimensional/two-dimensional position measuring unit 32, an altitude-information memory 34, an altitude-information difference extracting unit 36, and a position determining unit 38. Upon determining that multiple GPS satellites that can be tracked exist based on the signals received from the receiving unit 14, the GPS-satellitecombination determining unit 30 determines a combination or combinations of GPS satellites therefrom. The position measuring unit 32 measures a two-dimensional or three-dimensional position based on the signals of the combination(s) of the GPS satellites. The altitude-information memory 34 stores the altitude information (herein referred to as "absolute altitude $Z_0$") obtained by the altitude-information obtaining unit 16 and sequentially updates the contents of the stored altitude information. The altitude-information difference extracting unit 36 extracts a difference between an absolute altitude Z contained in the three-dimension position measured by the position measuring unit 32 and the absolute altitude $Z_0$ stored in the altitude-information memory 34. The position determining unit 38 compares the difference determined by the altitude-information difference extracting unit 36 with a threshold, and determines the measurement position of the moving object based on the result of the comparison.

The GPS-satellite-combination determining unit 30 identifies GPS satellites that can be tracked, based on the signals from the receiving unit 14. When the number of GPS satellites that can be tracked is five or more, the combination determining unit 30 determines combinations of four satellites from the GPS satellites. Thus, the combination determining unit 30 determines combinations of four GPS satellites from n GPS satellites, that is, n "see four", (where n indicates the number of GPS satellites that can be tracked and is a natural number equal to 5 or more). Thus, when the number of GPS satellites that can be tracked is five, the number of combinations is five.

Upon receiving the GPS-satellite combinations from the combination determining unit 30, the position measuring unit 32 measures the position for each combination. For example, as show in FIG. 3, when GPS satellites that can be tracked are numbered "3", "7", "15", "24", and "29", the number of combinations is five, specifically, "3, 7, 15, and 24", "3, 7, 15, and 29", "3, 7, 24, and 29", "3, 15, 24, and 29", and "7, 15, 24, and 29". Thus, the three-dimensional positions (X, Y, and Z) of the five combinations are measured. For example, the measurement result of the first combination of the GPS satellites 3, 7, 15, and 24 shows a latitude (X position) of 35° 41' 354297", a longitude (Y position) of 139° 41' 78353", and an absolute altitude (Z) of 578 m. When the number of GPS satellites that can be tracked is four, the number of combinations is determined to be one and the three-dimensional position for the combination is measured. When the number of GPS satellites that can be tracked is three, the two-dimensional position for the GPS satellites is measured.

The altitude-information memory 34 sequentially updates the altitude information obtained by the altitude-information obtaining unit 16 shown in FIG. 1 and sends the real-time absolute altitude of the moving object to the altitude-information difference extracting unit 36. A method for obtaining the altitude information may be, for example, a method in which a barometric pressure under which the moving object is located is measured using a barometer (a barometric-pressure sensor) and an absolute altitude is determined based on the measured barometric pressure. The barometer may be included in the altitude-information obtaining unit 16, or may be attached to the moving object or the like to input the barometric pressure and/or the absolute altitude to the altitude-information obtaining unit 16.

Alternatively, the altitude information can be obtained by utilizing a map database containing absolute altitudes or relative altitudes. In this case, for example, altitude information corresponding to the moving-object XY positions (latitude and longitude) obtained by GPS position measurement can be read from the map database. XY positions obtained by dead-reckoning-based position measurement, other than the GPS position measurement, may also be used to obtain the altitude information.

The altitude-information difference extracting unit 36 compares the absolute altitude $Z_0$ stored in the altitude-information memory 34 with the absolute altitude Z contained in the three-dimensional position measured by the position measuring unit 32 to extract a difference therebetween (i.e., $|Z_0 - Z|$). For example, if the number of GPS-satellite combinations is five, the altitude-information difference extracting unit 36 extracts the differences between five absolute altitude Z and corresponding five absolute altitude $Z_0$. The differences obtained by the altitude-information difference extracting unit 36 are sent to the position determining unit 38.

Figure 4:
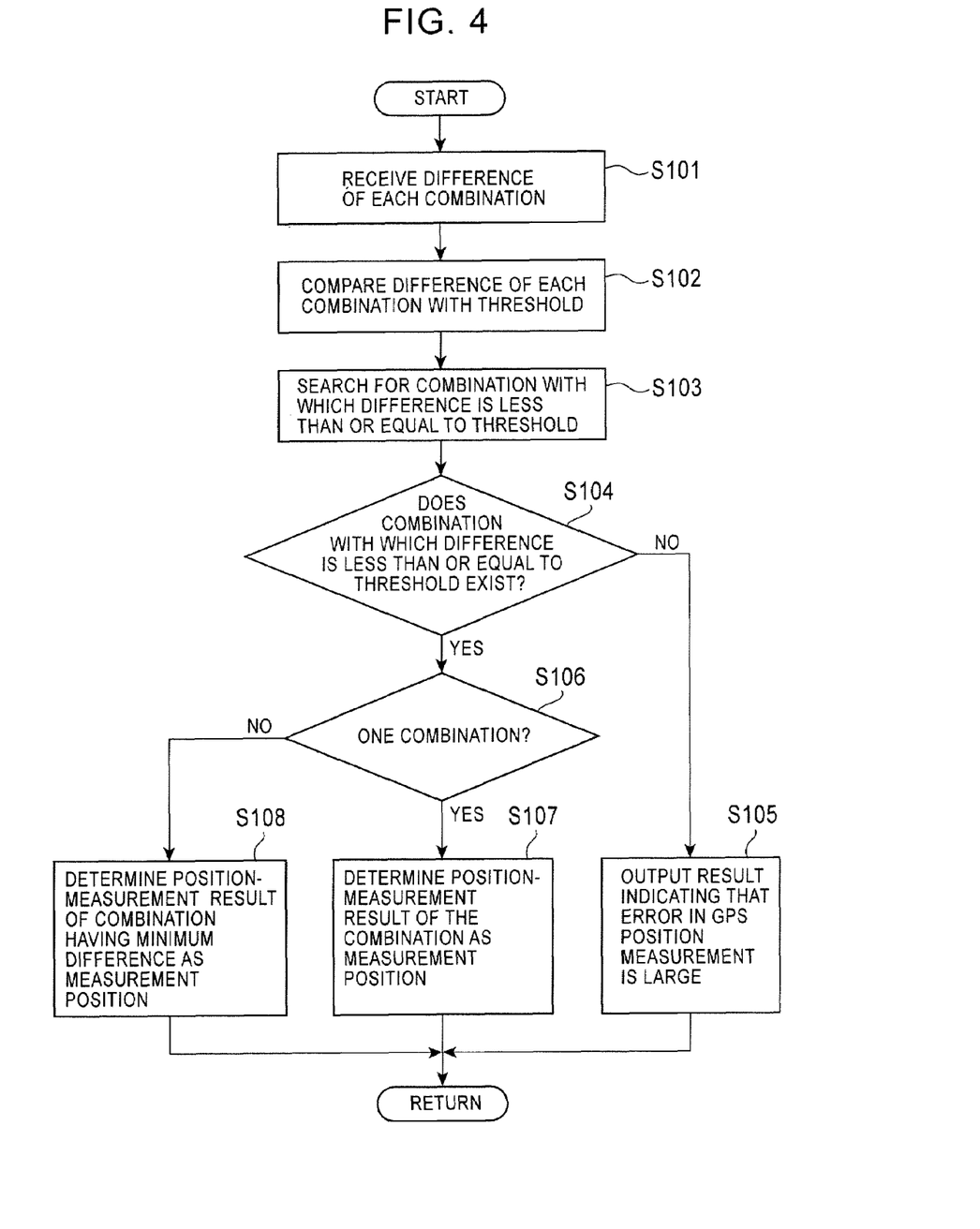
FIG. 4 is a flowchart showing the operation of the position determining unit shown in FIG. 2.

FIG. 4 is a flowchart showing the operation of the position determining unit 38. When the position determining unit 38 receives the difference of each combination from the difference extracting unit 36 (in step S101), the position determining unit 38 compares the difference of each combination with a preset threshold S (in step S102). The threshold S is used to determine the accuracy of GPS position measurement. For example, when the accuracy of GPS position measurement is determined with reference to the absolute altitude $Z_0$ obtained from the barometer, the threshold S is determined based on the accuracy of the barometer.

Next, the position determining unit 38 searches for a GPS-satellite combination or GPS-satellite combinations with which the difference is less than or equal to the threshold S (in step S103). When a combination with which the difference is less than or equal to the threshold S does not exist (in step S104), the position determining unit 38 determines that error in the GPS position measurement is large and generates a result indicating so (in step S105). The result is supplied to, for example, a navigation apparatus, so that the navigation apparatus can exclude the GPS position measurement from the determination of the vehicle position.

When a GPS-satellite combination or GPS-satellite combinations with which the difference is less than or equal to the threshold S exist (in step S104), the position determining unit 38 further determines whether or not the number of combinations is one (in step S106). When the number of combinations with which the difference is less than or equal to the threshold S is one, the position determining unit 38 regards the combination as being optimum and determines the position-measurement result of the combination as the measurement position (in step S107). When multiple combinations with which the difference is less than or equal to the threshold S exist, it is preferred that the position determining unit 38 select a combination with which a difference between the aforementioned difference and the threshold S is a minimum from the multiple combinations and determine that the position-measurement result of the selected combination as the measurement position (in step S108).

Figure 3:
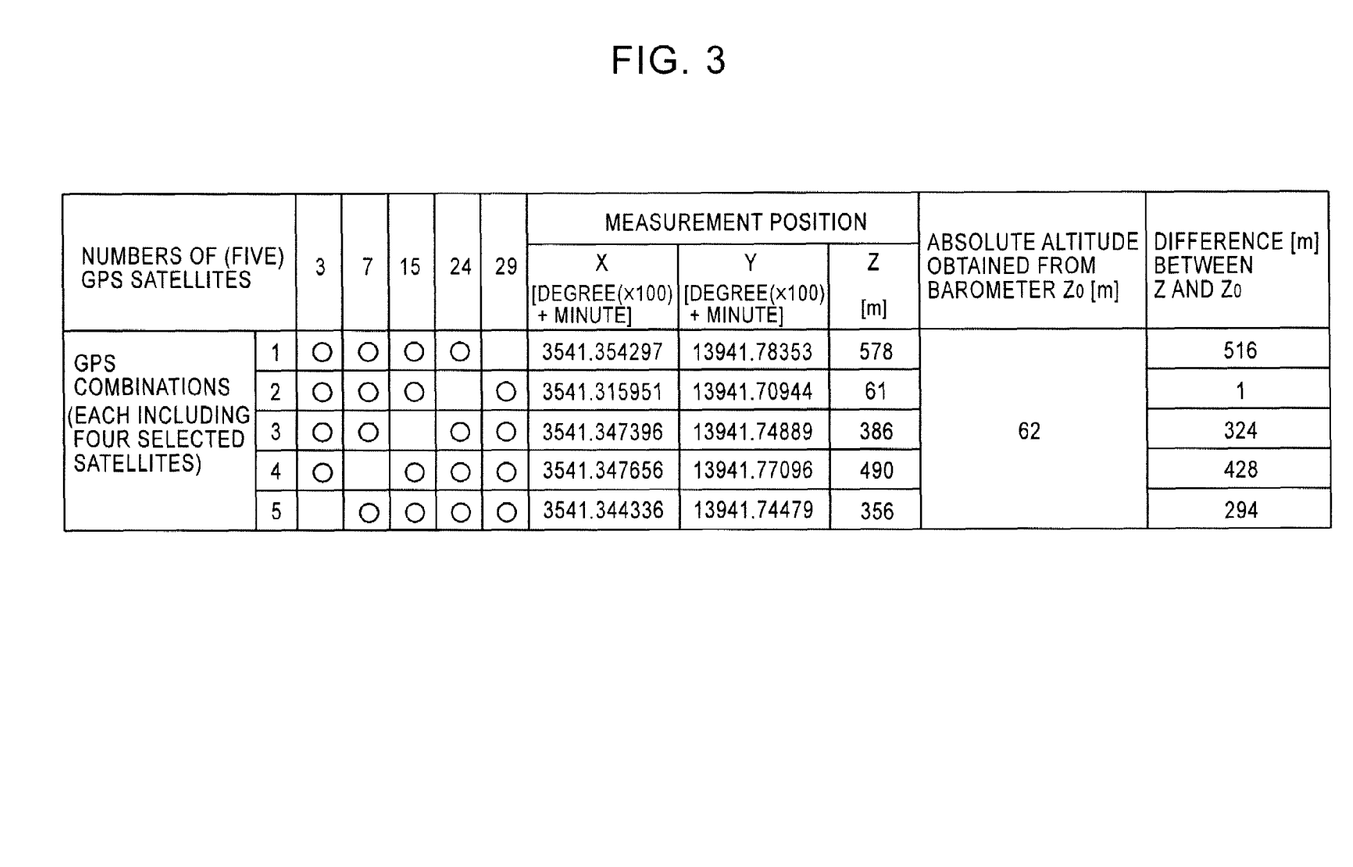
FIG. 3 is an example showing the relationship between a measurement position and an absolute altitude for each GPS-satellite combination.

Referring to FIG. 3, as described above, five combinations are determined from five tracked GPS satellites and the three-dimensional position for each combination is determined. The absolute altitude $Z_0$ supplied from the altitude-information memory 34 is 62 m. When differences between the absolute altitudes Z measured based on the first to fifth combinations and the absolute altitudes $Z_0$ obtained from the altitude-information memory 34 are determined, the differences are 516 m, 1 m, 324 m, 428 m, and 294 m in that order from the top. If the barometer has a margin or error of 3 m, the threshold S is set to 3 m. In the example shown in FIG. 3, the combination with which the difference is less than or equal to the threshold S is the second combination. The differences for the other combinations exceed the threshold S, and this means the combinations include GPS satellites affected by multipath. In other words, since the second combination excludes the GPS satellite 24 and all the other combinations include the GPS satellite 24, it can be identified that the GPS satellite 24 is a satellite affected by multipath.

Thus, since the absolute-altitude difference for the second combination of the GPS satellites 3, 7, 15, and 29 is less than or equal to the threshold S, it can be regarded that the accuracy of the GPS position measurement is favorable and the measurement result of the combination is thus used as the measurement position. In this case, either 61 m resulting from the GPS position measurement or 62 m obtained from the altitude-information memory (the barometer) may be used as the absolute altitude.

In the example shown in FIG. 3, the number of combinations with which the difference is less than or equal to the threshold is only one. If, however, the number of combinations with which the difference is less than or equal to the threshold is two or more, the measurement position for a combination having a minimum difference may be used as the measurement position, as described above, or the average of the position-measurement results of multiple combinations may be used as the measurement position. On the other hand, when a combination with which the difference is less than or equal to the threshold S does not exist, this means that the GPS position-measurement accuracy is low due to a large error. In such a case, the generation and/or use of the measurement-position result may be stopped, or a result indicating that the accuracy is low may be generated.

Figure 5:
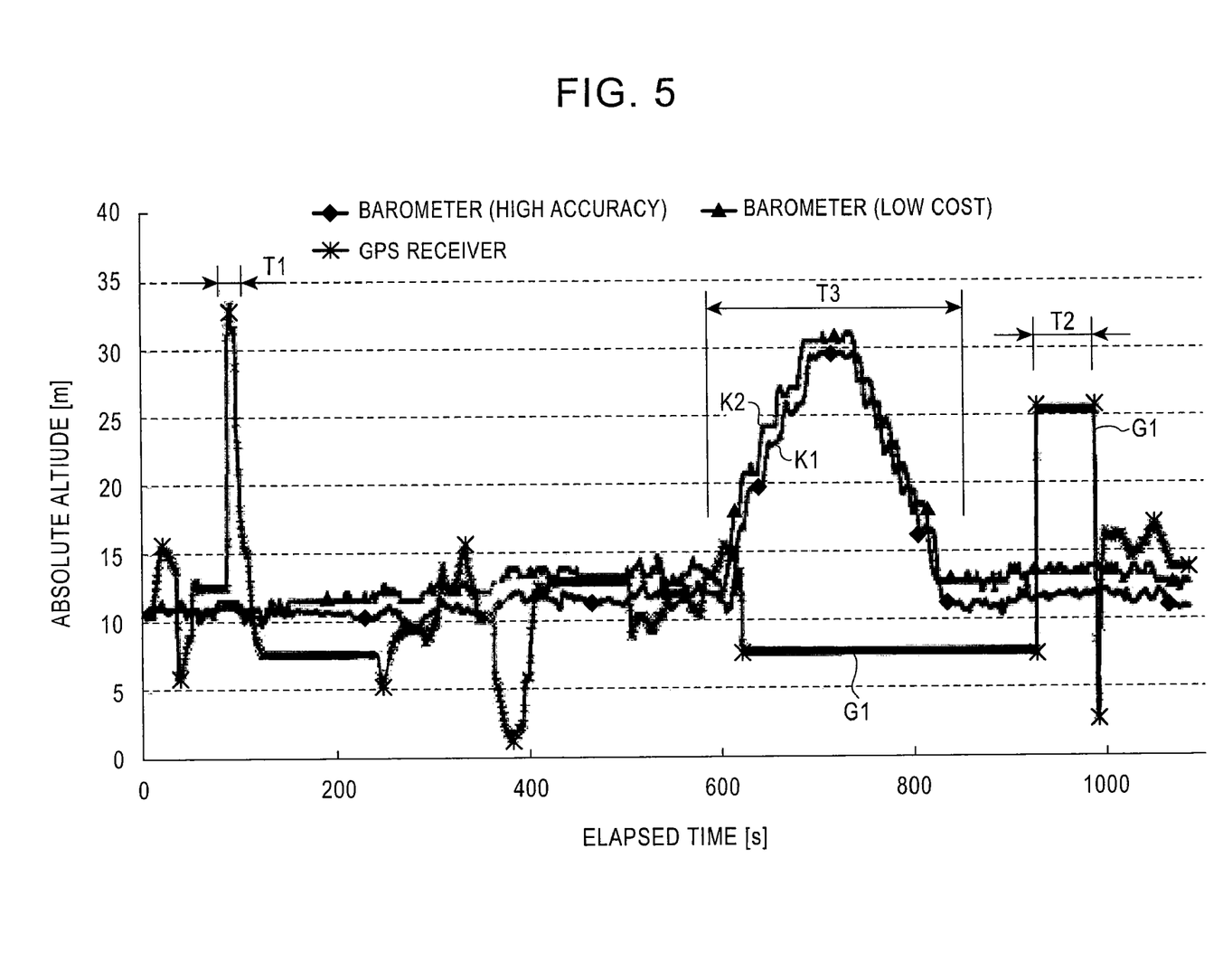
FIG. 5 is a graph showing actual data measured in an urban area, the data including absolute altitudes obtained by barometers and an absolute altitude obtained by GPS position measurement.

FIG. 5 is a graph showing actual data measured in an urban area and comparing absolute altitudes obtained by barometers and an absolute altitude obtained by GPS position measurement. The vertical axis in FIG. 5 indicates an absolute altitude [m] and the horizontal axis indicates elapsed time [s]. The actual measurement data include data obtained from a high-accuracy barometer K1 with a temperature-compensating function, data obtained from a low-cost barometer K2 without a temperature-compensating function, and data obtained from a GPS receiver G1. The data of the high-accuracy barometer K1 and the data of the low-cost barometer K2 exhibit substantially the same absolute altitude, but the data of the GPS position measurement displays sharp changes in absolute altitude due to multipath in a period T1 in which the elapsed time is about 100 seconds and in a period T2 in which the elapsed time is about 900 seconds (as shown in FIG. 5). In a period T3, in which the elapsed time is about 600 to 800 seconds, the moving object entered a multilevel parking facility where the GPS position measurement cannot be performed. During the period T3, the absolute altitude obtained from the GPS position measurement is constant, whereas the absolute altitudes obtained from the barometers K1 and K2 faithfully reflect the altitude from the entry of the moving object into the multilevel parking facility until the exit therefrom.

As described above, when there is no multipath influence, the absolute altitude obtained by the GPS position measurement has substantially the same value as the absolute altitude obtained by the barometer(s). It can be regarded that the difference between the two absolute altitude obtained by the GPS position measurement and the absolute altitude obtained by the barometer falls within the margin or error of the barometer. Thus, when the absolute altitude obtained by the GPS position-measuring deviates by a certain amount from the absolute altitude obtained by the barometer, it can be regarded that the GPS satellite is affected by multipath or the GPS satellite position cannot be measured. Thus, excluding such a GPS satellite affected by multipath from the position measurement makes it possible to prevent the accuracy of the GPS position measurement from deteriorating.

A GPS position-measuring device according to a modification of the embodiment of the present invention will now be described. When the number of GPS satellites that can be tracked is large, for example, when eight GPS satellites that can be tracked exist, the number of combinations, each consisting of four GPS satellites selected from the eight GPS satellites, is 70. In order to reduce the load of the position measuring unit 32 and to increase the processing speed, the position determining unit 38 may issue an instruction for stopping the position measurement of unprocessed combinations to the position measuring unit 32 upon confirming that a combination with which the difference is less than or equal to the threshold S exists. In this case, the position determining unit 38 first uses, as the measurement position, the position-measurement result of the combination with which the difference is less than or equal to the threshold S.

Dilution of precision (DOP) is a concept for expressing the accuracy of GPS position measurement. Position dilution of precision (PDOP) indicates the quality of GPS geometry, and as the volume of a tetrahedron that is formed by connecting four satellites increases, the accuracy increases and the PDOP value decreases. When the PDOP value obtained from a combination of GPS satellites is a predetermined value or more, the GPS-satellite-combination determining unit 30 may regard that error for the combination is large and exclude it from combinations so as to prevent the measurement thereof. With this arrangement, it is possible to increase the efficiency and speed of the processing of the position measuring unit 32 and the position determining unit 38.

Figure 6A:
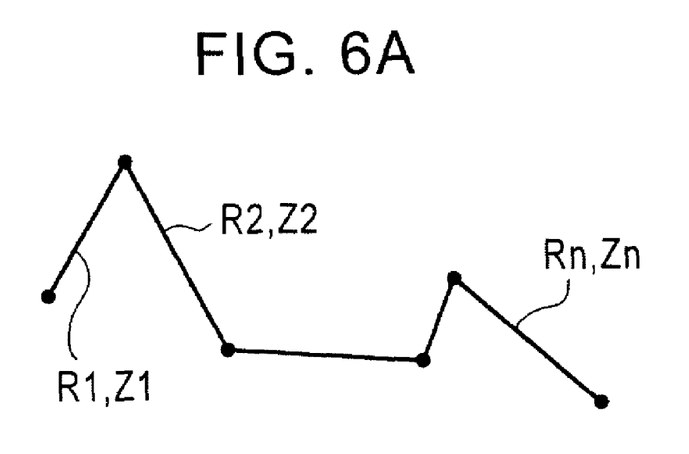
FIGS. 6A and 6B show examples in which altitude information is obtained from a map database, FIG. 6A illustrating an example in which absolute altitudes are allotted to road (link) data and FIG. 6B illustrating an example in which map data is divided into sections and absolute altitudes are allotted thereto.

An example in which the altitude information is obtained from a map database will now be described. The map database contains roads and maps to allow a navigation apparatus or the like to display roads and maps in the vicinity of the vehicle. A first method for storing the altitude information in the map database is, as shown in FIG. 6A, to contain absolute altitudes $Z1, Z2, \ldots,$ and $Zn$ for corresponding roads (link) data $R1, R2, \ldots,$ and $Rn$ contained in the map database. For example, when the moving object is on the road R2, the absolute altitude $Z2$ can be obtained from the map database. The altitude information may be an absolute altitude or may be a relative altitude indicating a difference relative to an adjacent road.

Figure 6B:
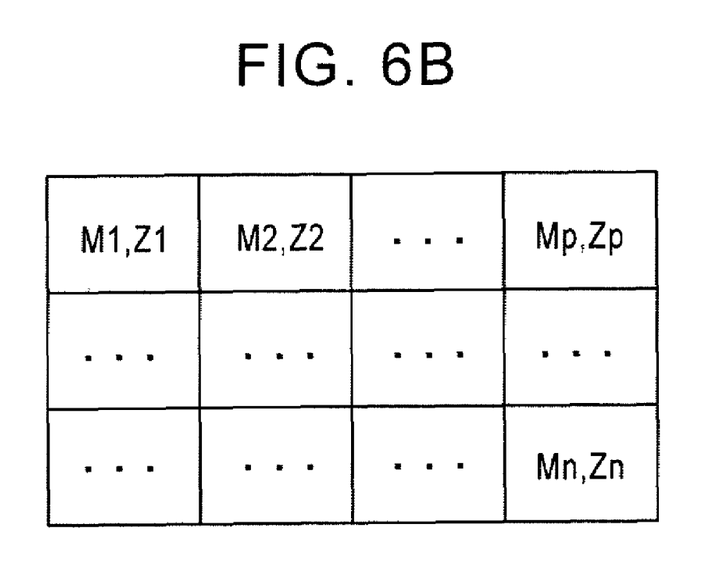

For example, a second method is, as shown in FIG. 6B, to divide map data into rectangular sections $M1, M2, \ldots, Mp, \ldots,$ and $Mn$ having certain areas and allot absolute altitudes $Z1, Z2, \ldots, Zp, \ldots,$ and $Zn$ to the corresponding sections. For example, when the position of the moving object is in the section M2, the absolute altitude $Z2$ of the section M2 can be obtained. In this case, the altitude information may be a relative altitude expressed by a difference relative to the altitude of an adjacent section. The shape and the size of the sections can be changed as appropriate.

The moving-object position on the map database can be located using X and Y coordinates obtained by GPS position measurement. Alternatively, a dead-reckoning sensor (e.g., including an angle sensor and a distance sensor), instead of the GPS position measurement, may be used to obtain X and Y coordinates.

In addition, the GPS position-measuring device may use communicating means to obtain the absolute altitude in the vicinity of the moving object. For example, the function of a VICS (Vehicle Information and Communication System), in which a light beacon or a radio-wave beacon transmits light or radio waves to a moving object in a certain area centering on the beacon, may be used to transmit altitude information, so as to allow the moving object to receive its absolute altitude in the area. Needless to say, an absolute altitude may be received from wireless information provided by a road-information providing service, other than the VICS, or an absolute altitude held by another vehicle may be received through inter-vehicle communication.

A preferable configuration example for determining an absolute altitude from a barometer will now be described. When a barometer is used, it is preferable to consider barometric-pressure variations due to the weather. This is because, when a low-pressure system or a hurricane is approaching or passing, the barometric-pressure variations become significant and the accuracy associated with the barometer is likely to deteriorate. For example, when a barometric-pressure variation due to the passing of a low-pressure system is 2 hPa/h, an error of about 16 m in height occurs in one hour. When a barometric-pressure variation due to the passing of a hurricane is 2 hPa/15 minutes, an error of about 16 m in height occurs in 15 minutes.

When the barometric-pressure variation is large in that manner, the measurement result of the barometer cannot be reliable. In such a case, it is desired not to use the absolute altitude obtained by the barometer or it is desired to change the aforementioned threshold to compensate for the accuracy.

For example, the barometer reliability can be determined by a method as follows.

1) First, an absolute altitude in the map database or the like is used to obtain an absolute-altitude reference. When an absolute altitude obtained from the barometer is updated, a time required after the previous update and the amount of offset correction (a difference relative to the reference) at this point of time are recorded.
2) Next, the time required after the previous update and the amount of offset correction are used to calculate an amount of absolute-altitude offset correction A per unit time.
3) When the amount of offset correction A is less than or equal to a threshold W, it is regarded that the barometer reliability is high and the barometer is thus used to identify GPS-satellite combinations. On the other hand, when the amount of offset correction A exceeds the threshold W, the barometer-pressure variation is large and it is thus regarded that the barometer reliability is low until a next update is performed. Thus, the barometer is not used to identify GPS-satellite combinations. Alternatively, when the amount of offset correction A exceeds the threshold W, the threshold S may be changed since the barometer reliability is low. That is, the threshold S when the barometer reliability is low is set higher (or larger) than the threshold S when the reliability is high.

Figure 7:
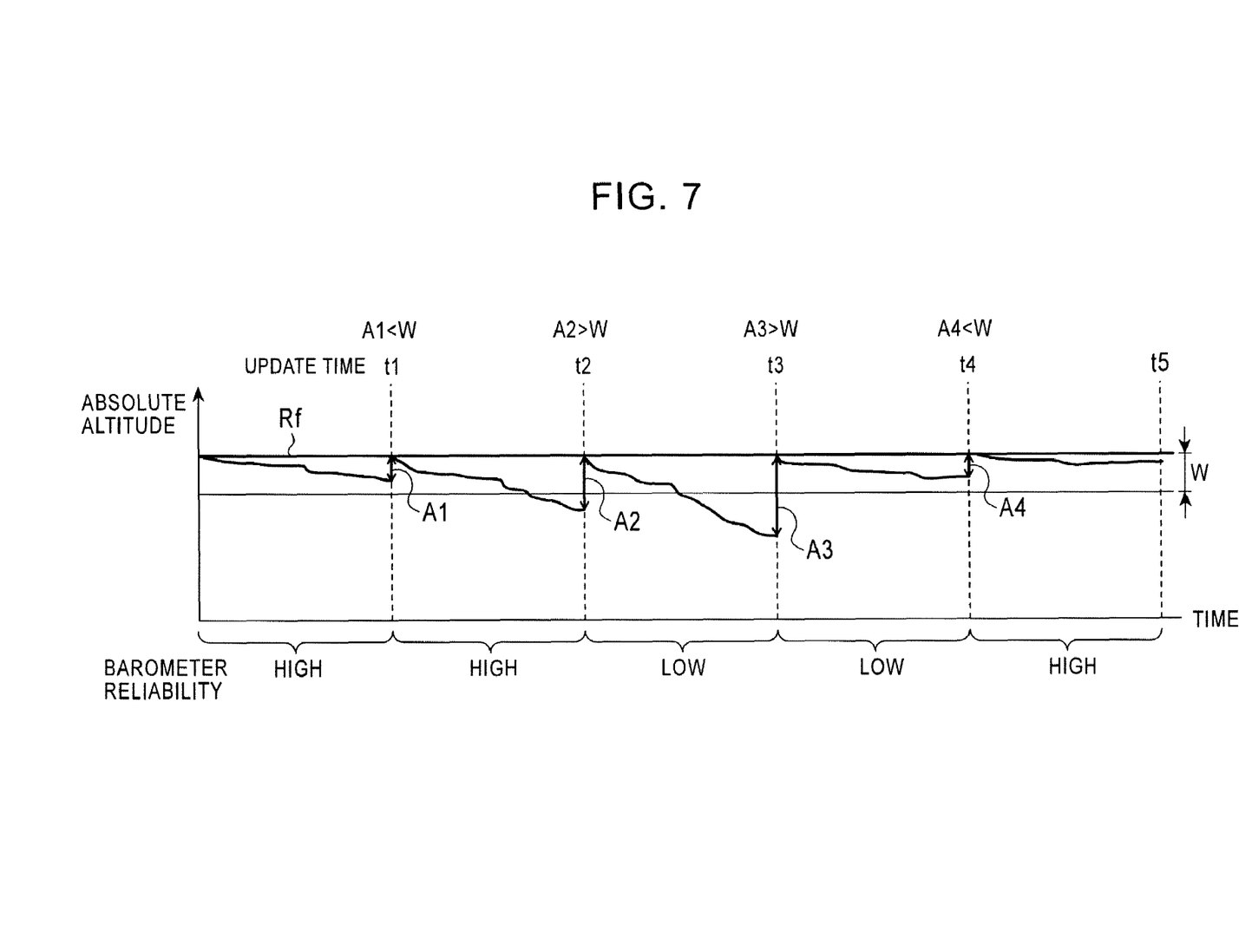
FIG. 7 is a graph showing an example for determining the reliability of a barometer.

FIG. 7 is a graph showing a result of a determination of the barometer reliability. In FIG. 7, Rf indicates a reference absolute altitude. The amount of offset correction A per unit time is calculated at update times t1, t2, . . . , and t5. At update time t1, the amount of offset correction A1 is smaller than the threshold W, so that it is determined that the barometer reliability during this period is high. When the amount of offset correction A2 at the update time t2 exceeds the threshold W, it is determined that the reliability in the period of t1 to t2 is high and the reliability after the update time t2 is low. When the amount of offset correction A3 at update time t3 is larger than the threshold W, it is also determined that the reliability after t3 is low. When the amount of offset correction A4 at update time t4 becomes smaller than the threshold W, it is determined that the reliability after the update time t4 is high.

Figure 8:
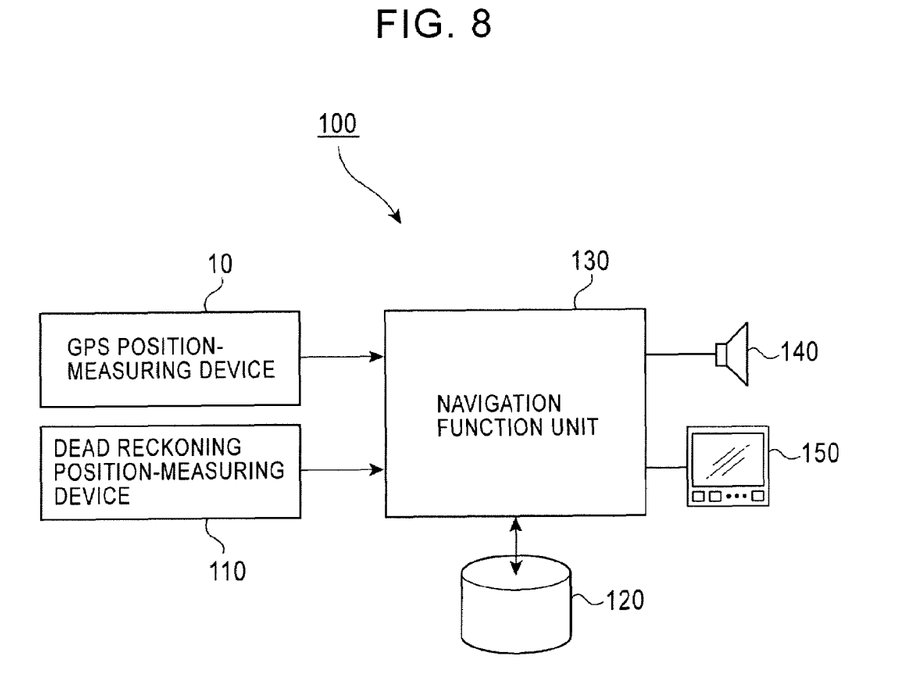
FIG. 8 is a block diagram showing the configuration of a navigation apparatus that includes the GPS position-measuring device of the present embodiment.

A navigation apparatus including a GPS position-measuring device according to the present embodiment will now be described. FIG. 8 is a block diagram of such a navigation apparatus. A navigation apparatus 100 includes the GPS position-measuring device 10 according to the present embodiment, a dead-reckoning position-measuring device 110 for measuring a position by dead reckoning, a database 120 for storing road-map database and so on, a navigation function unit 130 for executing navigation such as route search and route guidance, a speaker 140, and a display 150.

The navigation function unit 130 receives the measurement position determined by the GPS position-measuring device 10. Then, based on the received measurement position, the navigation function unit 130 reads, from the database 120, the vicinity map of a road on which the moving object, such as a motor vehicle, is located, and displays the map read on the display 150. Upon receiving a signal generated indicating that error in the GPS position measurement is large from the GPS position-measuring device 10 (in step S105 shown in FIG. 4), the navigation function unit 130 gives priority to or uses a position measured by the dead-reckoning position-measuring device 110 to determine the position of the moving object, without using the GPS position measurement. This arrangement eliminates a GPS position-measurement result that has a large error affected by multipath.

Although the particular embodiment of the present invention has been described above, the present invention is not limited thereto, and various changes and modifications can be made within the scope and spirit of the present invention disclosed in the appended claims.

The GPS position-measuring device according to the present invention is applicable to GPS receivers mounted on moving objects such as vehicles, navigation apparatuses, navigation systems, or electronic apparatuses such as computers having navigation functions.

What is claimed is:

1. A GPS position-measuring device for determining a position of a moving object by using GPS position measurement the GPS position-measuring device comprising:
   altitude obtaining means for obtaining non-GPS altitude information of the moving object;
   measuring means for determining (1) multiple GPS-satellite combinations from among multiple GPS satellites that can be tracked and (2) a GPS based three-dimensional position of the moving object for each of the multiple GPS-satellite combinations;
   difference extracting means for determining a difference in altitude between altitude information associated with the GPS based three-dimensional position and the non-GPS altitude information obtained by the altitude obtaining means for each of the multiple GPS-satellite combinations; and
   position determining means for comparing the extracted difference in altitude with a threshold value for each of the multiple GPS-satellite combinations, wherein when a single GPS-satellite combination for which the difference in altitude is less than or equal to the threshold value, the position determining means selects the single GPS-satellite combination, and when multiple GPS-satellite combinations for which the difference in altitude is less than or equal to the threshold value exist, the position determining means selects a minimum GPS-satellite combination for which the difference in altitude is a minimum from among the multiple GPS-satellite combinations that can be tracked, and a measurement position of the moving object is determined based on the GPS based three-dimensional position of the selected GPS-satellite combination.

2. The GPS position-measuring device according to claim 1, wherein the measuring means determines n GPS-satellite combinations of four GPS satellites, where n indicates the number of GPS satellites that can be tracked and is a natural number that is equal to 5 or more.

3. The GPS position-measuring device according to claim 1, wherein the measuring means excludes a GPS-satellite combination for which a value of position dilution of precision for the corresponding GPS satellites is larger than or equal to a predetermined value.

4. The GPS position-measuring device according to claim 1, wherein, when a GPS-satellite combination for which the difference in altitude is less than or equal to the threshold value does not exist, the position determining means does not use, as the measurement position, the GPS based three-dimensional position.

5. The GPS position-measuring device according to claim 1, wherein the non-GPS altitude information is an absolute altitude determined from a barometric pressure measured by a barometer.

6. The GPS position-measuring device according to claim 1, wherein the non-GPS altitude information is an absolute altitude determined from a road map database.

7. The GPS position-measuring device according to claim 1, wherein the position determining means changes the threshold value in accordance with reliability of the non-GPS altitude information obtained by the altitude obtaining means.

8. The GPS position-measuring device according to claim 1, wherein the GPS position-measuring device is interconnected with a navigation apparatus that performs road guidance for the moving object based on the measurement position determined by the GPS position-measuring device.

9. A GPS position-measuring method for determining a position of a moving object by using GPS position measurement, the GPS position-measuring method comprising:
obtaining non-GPS based altitude information of the moving object;
determining (1) n GPS-satellite combinations of at least four GPS satellites from. multiple GPS satellites that can be tracked and (2) a GPS derived three-dimensional position of the moving object for each of the GPS-satellite combinations, where n is a natural number that is equal to 5 or more;
determining a difference in altitude between GPS derived altitude information contained in the GPS derived three-dimensional position and the non-GPS based altitude information for each of the n GPS-satellite combinations of at least four GPS satellites that can be tracked;
selecting a GPS-satellite combination from among the n GPS-satellite combinations of at least four GPS satellites that can be tracked for which the associated difference in altitude between GPS derived altitude information contained in the GPS derived three-dimensional position and the non-GPS based altitude information is a minimum; and
determining a measurement position of the moving object based on the GPS derived three-dimensional position of the selected GPS-satellite combination having the GPS derived altitude information that is closest to the non-GPS based altitude information from among the n GPS-satellite combinations of at least four GPS satellites that can be tracked.

10. The GPS position-measuring method according to claim 9, wherein, when determining the GPS derived three-dimensional position, a combination for which a value of position dilution of precision for the OPS satellites is larger than or equal to a predetermined value is excluded.

11. The GPS position-measuring method according to claim 9, wherein, when determining the difference in altitude, if a combination for which the difference in altitude is less than or equal to a threshold value does not exist, the GPS derived three-dimensional position is not used as the measurement position.

12. The GPS position-measuring method according to claim 9, wherein the non-GPS based altitude information obtained comprises an absolute altitude determined from a barometric pressure measured by a barometer.

13. The GPS position-measuring method according to claim 9, wherein the non-GPS based altitude information obtained comprises an, absolute altitude determined from a road map database.

14. The GPS position-measuring method according to claim 9, wherein comparing the difference in altitude comprises changing the threshold value in accordance with reliability of the non-GPS based altitude information obtained.

15. A GPS position-measuring method for determining a position of a moving object by using GPS position measurement, the GPS position-measuring method comprising:
obtaining non-GPS based altitude information of the moving object;
determining (1) n GPS-satellite combinations of at least four GPS satellites from among multiple GPS satellites tat can be tracked and (2) a GPS derived three-dimensional position of the moving object for each of the n GPS-satellite combinations, where n is a natural number that is equal to 5 or more;
determining a difference between GPS derived altitude information contained in the measured GPS derived three-dimensional position and the non-GPS based altitude information obtained for each of the n GPS-satellite combinations;
comparing the difference in altitude with a threshold value for each of the n GPS-satellite combinations;
wherein, when only a single GPS-satellite combination for which the difference in altitude is less than or equal to the threshold value exists, the single GPS-satellite combination is selected to be the selected GPS-satellite combination, and
when multiple GPS-satellite combinations for which the difference in altitude is less than or equal to the threshold value exist, a minimum difference GPS-satellite combination for which, the difference in altitude is a minimum from among the multiple GPS-satellite combinations is selected to be the selected GPS-satellite combination; and
determining a measurement position of the moving object based on the GPS derived three-dimensional position of the selected GPS-satellite combination.

16. The GPS position-measuring method according to claim 15, wherein, when determining the GPS derived three-dimensional position, a GPS-satellite combination with which a value of position dilution of precision is larger than or equal to a predetermined value is excluded.

* * * * *

UNITED STATES PATENT AND TRADEMARK OFFICE
CERTIFICATE OF CORRECTION

PATENT NO. : 7,692,583 B2  Page 1 of 1
APPLICATION NO. : 11/938026
DATED : April 6, 2010
INVENTOR(S) : Takayuki Watanabe It is certified that error appears in the above-identified patent and that said Letters Patent is hereby corrected as shown below:

In the Claims

In column 10, claim 1, lines 35-36, immediately after "position measurement" insert --,--.

In column 11, claim 9, line 38, replace "from.multiple" with --from multiple--.

In column 12, claim 10, line 4, replace "OPS" with --GPS--.

In column 12, claim 13, line 18, after "comprises" replace "an, absolute" with --an absolute--.

In column 12, claim 15, line 26, after "position-measuring method" insert --being performed by a processor, the GPS position-measuring method--.

In column 12, claim 15, line 31, before "can be tracked" replace "tat" with --that--.

In column 12, claim 15, line 45, after "is selected" insert --by the processor--.

In column 12, claim 15, line 50, before "difference in altitude" replace "which, the" with --which the--.

In column 12, claim 15, line 52, before "to be the selected" insert --by the processor--.

In column 12, claim 15, line 54, after "moving object" insert --via the processor--.

In column 12, claim 15, line 56, replace "combination." with --combination that is selected by the processor.--.

Signed and Sealed this

Eighth Day of June, 2010

David J. Kappos
*Director of the United States Patent and Trademark Office*